Figure 1:
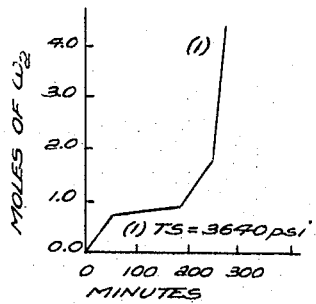

May 10, 1966  O. W. BURKE, JR., ETAL  3,250,594
SILICA PIGMENTS AND PREPARATION THEREOF
Filed Dec. 30, 1964

INVENTORS
OLIVER W. BURKE JR.,
CAREY B. JACKSON,

BY

ATTORNEY

United States Patent Office 3,250,594
Patented May 10, 1966

3,250,594
SILICA PIGMENTS AND PREPARATION THEREOF
Oliver W. Burke, Jr., 506 Intracoastal Drive, Fort Lauderdale, and Carey B. Jackson, Pompano Beach, Fla.; said Jackson assignor to said Burke, Jr.
Filed Dec. 30, 1964, Ser. No. 422,144
19 Claims. (Cl. 23—182)

This application is a continuation-in-part of our co-pending applications S.N. 142,661 now abandoned; S.N. 142,662 now Patent No. 3,172,726; S.N. 142,494 now Patent No. 3,202,525; S.N. 142,495 now Patent No. 3,178,388 and S.N. 142,496 now abandoned all filed October 3, 1961.

This invention relates to silica pigment materials and to the preparation thereof from alkali silicate, and aims generally to improve the same.

OBJECTS

Particular objects of the present invention, severally and interdependently, are to provide an improved process for the preparation of silica pigments; to provide a process for controlling the relative sizes of the primary particles of colloidal silica and of the aggregates and flocs thereof which form the silica pigment particles, e.g. for the production of improved silica pigment materials; and to provide an improved silica pigment having useful characteristics and at an economical cost.

Other objects and advantages of the invention will be apparent from a consideration of the herein set forth general and specific description of illustrative embodiments thereof.

PRESENT INVENTION—IN GENERAL

The present invention is concerned with the production of silica pigment by the acidulation of alkali metal silicate e.g. sodium silicate, especially with carbon dioxide as acidulating agent, and is characterized by the alteration, during certain predetermined stages of the acidulation, of the rate at which the acidulation is being accomplished.

The course of the acidulation of sodium silicate solution to precipitate silica therefrom can be classified in several distinct stages. Prior to acidulation, of course, is the preparatory stage in which the sodium silicate is diluted with water and in which the factor $x$ designating the ratio of $SiO_2$ to $Na_2O$ in the sodium silicate formula $Na_2O(SiO_2)x$ remains unchanged. As a practical matter, in commercial sodium silicate used for the production of precipitated silica, the value of $x$ lies in the range of about 3.0 to 3.4, e.g. 3.22 in the 41° –Bé sodium silicate of commerce.

The first period in the acidulation we call the pre-precipitation period, during which the silica of solution is polymerizing to form colloidal particles, that is, the primary silica particles also sometimes called the ultimate silica particles. In this period, no appreciable number of colloidal silica particles have aggregated to form silica network particles. The end of this period we consider extends to a point at which the $x$ value lies in the range of 4.2 to 5.3 (depending on the conditions present). The present invention aims to provide a method of controlling the size of the colloidal particles produced in the first stage in relation to the size of network particles formed in the second stage.

The second period we term the incipient precipitation period. This period embraces a region in which the colloidal silica particles aggregate to form network particles, and is detectable by the appearance of Tyndall effect, which usually occurs between $x$ values of 4.2 and 5.3.

The term Tyndall effect is used herein in the same manner as defined in J. Thewlis's Encylopaedic Dictionary of Physics, Pergamon Press, 1962, in which it is defined as follows:

"*Tyndall effect.*—The scattering of light by very small particles, the scattered light being predominantly blue."

This authority further states that:

"This phenomenon and its dependence on the size of the scattering particles was first investigated by Tyndall. The scattered intensity is proportional to the square of the volume of the particle and proportional to $1/\lambda^4$. Thus the scattering for light at the blue end of the spectrum is about ten times as great as for light at the red end."

Under appropriate conditions the appearance of the Tyndall effect may mark the commencement of the second stage. This second or incipient precipitation period continues to the point where precipitation of silica commences and preferably less than 10% of the silica has appeared as precipitate. This incipient precipitation period we consider to extend from the point at which $x$ has a value of between 4.2 and 5.3 to an $x$ value of about 6.4 or higher (depending on the conditions present). The present invention aims to provide a method of controlling the size of the network particles formed in the second stage independent of the size of the primary particles formed in the first stage.

The third period or the principal precipitation period of the acidulation is that period in which the major part of the precipitation of silica occurs and extend from the upper end of the second period when the precipitation of silica is commencing to the point at which the precipitation of silica is substantially complete, which is normally considered to be the point at which about 70% of the stoichiometric quantity of acidulating agent has been added and at which $x$ has a value of about 10 or more (which value may also vary with the conditions present, e.g. may be lowered to 40–50% of the stoichiometric amount when substantial quantities of non-acidulating electrolyte are present). Also depending on the conditions present, the extent of flocculation of the precipitate may vary.

After the precipitation has been completed, there is usually a fourth period of acidulation, during which at least the balance of the stoichiometric quantity of carbon dioxide to convert the $Na_2O$ of the sodium silicate to $Na_2CO_3$, and generally an amount somewhat in excess thereof, is added.

By the present invention, we have discovered that particular advantage is attained by a process for the precipitation of reinforcing silica pigment by the gradual acidulation of an aqueous solution of alkali metal silicate, especially sodium silicate, with the aid of carbon dioxide, particularly characterized in that the rates of addition of the carbon dioxide during at least two of the first three periods of acidulation are varied relative to each other in predetermined manners; the more rapid rate being limited only by the maximum rate at which the liquid under the conditions of acidulation can absorb $CO_2$; the slower rate being less than the more rapid rate by at least about 50%, and preferably by at least 90%, based on the slower rate.

In a first embodiment of the invention, the acidulating carbon dioxide may be added at one rate, e.g. a slow rate, during the first and second periods of acidulation, and at a second rate, e.g. the more rapid rate, during the third period, i.e. beginning as soon as the commencement of precipitation is observed. By this embodiment it is possible to control the size of the primary particles formed in the first stage as well as the size of the colloidal aggregates thereof formed in the second stage, by employing a set rate of acidulation under predetermined conditions, while controlling the flocculation and rate of separation of the precipitate by an altered rate of acidulation while the precipitation is occurring. This embodiment of the invention is to be distinguished from known procedures in which a constant slow rate of acidulation is employed until the precipitation of the pigment is substantially completed, i.e. throughout at least the first three stages set out above, the acidulation being either continued at such slow rate, or optionally at an increased rate, only after the precipitation is substantially complete, i.e. only during the fourth period of acidulation described above.

In a second embodiment of the invention, the procedure may involve relatively slow acidulation during the second stage and relatively rapid acidulation during the third stage, and may also involve relatively rapid acidulation during the first stage. By this embodiment it is possible to control the size of the primary particles formed in the first stage, as well as the size of the flocs precipitated in the third stage, relative to the size of the colloidal aggregates developed during the second stage.

In a third embodiment of the invention a slow rate of acidulation may be employed in the second and third stages, and a faster rate in the first stage. By this procedure the size of the primary particles may be reduced relative to the sizes of the colloidal aggregates and flocs thereof.

In a fourth embodiment, the more rapid rate may be employed in the second and third stages of acidulation, with the slower rate in the first stage. By this procedure the size of the primary particles may be increased relative to the sizes of the colloidal aggregates and flocs thereof.

In a fifth embodiment of the invention, a more rapid rate of acidulation may be employed in the second stage of the acidulation, with slower rates employed in the first and third stages. By this procedure the size of the colloidal aggregates may be varied relative to the size of the primary particles and relative to the size of the flocs produced.

In short, we have found that by applications of the present invention we can vary the size of the ultimate or primary particles relative to the size of the network aggregates thereof constituting the pigment particles, independently, and that by other applications of the invention we can vary the size of the flocs of network aggregates relative to the size of the network aggregates or pigment particles themselves, thus to facilitate filtration or prepare flocs well adapted for dispersion of the silica pigment to the extent required in the situs of use thereof.

The present invention may be applied in the acidulation of alkali metal silicate solutions having concentrations of alkali metal silicate—designated by the formula $M_2O(SiO_2)_x$ in which M is alkali metal—in the range of about 20 grams per liter to about 200 grams per liter, and being subjected to acidulation at temperatures between the freezing point and boiling point of water, i.e. from about 5° C. to about 100° C. at atmospheric pressure, or up to 200° C. or more if conducted under higher pressures, and with or without the initial or timed addition of electrolyte in accordance with the invention of our copending application S.N. 422,454, filed Dec. 30, 1964.

After the flocs of precipitated silica pigment have been formed they may be recovered from the mother liquor in any suitable or preferred manner, and may be used per se, or be subjected to after treatments appropriate for their intended use.

The carbon dioxide gas employed in this invention may be full strength or may be diluted with air or other inert gases, e.g. such as the dilute carbon dioxide gas produced by the combustion of hydrocarbons such as propane or butane.

The process of this invention may be conducted in a batchwise or stepwise manner, or continuously, depending on available equipment. Suitable apparatus, for example, is set forth in our copending application S.N. 142,668 filed Oct. 3, 1961, in which, for example, the present invention can be practiced as a continuous process wherein the acidulation is applied to moieties of the alkali-metal silicate solution in a series of zones, preferably coordinated with the periods of alteration of acidulation rates contemplated by the present invention.

After the silica pigment has been precipitated the silica product may be recovered from the mother liquor in any suitable way, e.g. by centrifuging, filtering, etc. and the silica pigment material may be removed as wet cake for further use with or without any further after-treatment.

In the examples herein, like after-treatments are employed in each of the examples of the respective series set out to exemplify the invention and its advantages, but the particular after-treatments are not claimed herein, and the novel ones thereof are claimed in other applications.

The silica product as wet filter or centrifuge cake may be master-batched with latices of natural or synthetic elastomers and/or plastomers.

The process may be conducted in a batchwise or stepwise manner, or continuously, depending on selected equipment.

The novel features of the invention are set forth in the claims appended hereto, but the practice of the invention itself will be more precisely understood by reference to the following specific examples embodying the same, which are to be considered as illustrative and not restrictive of the invention.

*Example 1*

This example was carried out in the following manner: to 2000 ml. of a 41° Bé aqueous solution containing 4 moles sodium silicate of the composition represented by $Na_2O(SiO_2)_{3.22}$ was added 14 liters of water and placed in a precipitator vessel equipped with an agitator and the temperature thereof raised to 79° C. To this hot aqueous sodium silicate solution was gradually added 4 liters of an aqueous solution containing 4 moles of sodium carbonate and concurrently therewith but over a more extended period was added 4 moles of carbon dioxide.

The rates of addition of the electrolyte and carbon dioxide together with other calculated data are set out in Table I hereof.

The silica precipitate was filtered and washed. About one-third of this filter cake was water washed, dried in an oven at 105° C., ground, and screened through a 150 mesh screen and this product was designated as silica 1–(1).

A second portion of the filter cake was mixed with 3 liters of sea water and then allowed to stand for 12 hours, then filtered, washed in 4 liters of water and dried and ground, and the product was designated as silica 1–(2). The after-treatment with sea water is claimed in U.S. application S.N. 142,495.

The third portion was washed and acidified with 2 N HCl until acid to methyl orange then sufficient sodium carbonate was added to make the precipitate just alkaline to methyl organe then the precipitate was filtered, washed and dried in an oven at 105° C., ground and screened through a 150 mesh screen and this product was designated as silica 1–(3).

TABLE I

| Time cumulative (minutes) | Sodium carbonate Added cumulative (moles) | Acidification (moles $CO_2$ cumulative) | Acidification (percent) | $Na_2O(SiO_2)_x$ (value of $x$ in system) | Acidulation rate per period (moles x $10^{-2}$/ min. averaged) |
|---|---|---|---|---|---|
| 0 | | 0 | 0 | 3.22 | |
| 15 | | 0.20 | 5 | 3.39 | 1.27 moderate rate. |
| 30 | | 0.40 | 10 | 3.58 | Do. |
| 55 | 0.04 | 0.70 | 17.5 | 3.90 | Do. |
| 70 | 0.24 | 0.72 | 18 | 3.93 | 0.123 slow rate. |
| 85 | 0.30 | 0.76 | 19 | 3.98 | Do. |
| 100 | 0.46 | 0.78 | 19.5 | 4.00 | Do. |
| 130 | 0.58 | 0.80 | 20 | 4.03 | Do. |
| 160 | 0.82 | 0.83 | 20.8 | 4.07 | Do. |
| 185 | 1.00 | 0.86 | 21.5 | 4.10 | Do. |
| 190 | 1.04 | 0.94 | 23.5 | 4.21 | 1.45 moderate rate. |
| 220 | 1.35 | 1.24 | 31 | 4.67 | Do. |
| 235 | 1.44 | 1.48 | 37 | 5.10 | Do. |
| 240 | 1.90 | 1.64 | 41 | 5.45 | Do. |
| 250 | 2.56 | 1.80 | 45 | 5.85 | Do. |
| 255 | 3.20 | 2.10 | 52.5 | 6.79 | 9.73 fast rate. |
| 265 | 4.00 | 2.88 | 72 | 11.5 | Do. |
| 270 | | 3.68 | 92 | | Do. |
| 273 | | 4.00 | 100 | | Do. |
| 275 | | 4.23 | 106 | | Do. |

The silica pigment materials designated as silicas 1–(1), 1–(2) and 1–(3) were each compounded with a butadienestyrene type elastomer (SBR–1500) according to the compounding recipe set forth in Table II hereof.

TABLE II

| Compound ingredients: | Quantities (pts. wt.) |
|---|---|
| Butadiene-styrene copolymer ([1]) | 100.0 |
| Silica filler material | 58.5 |
| Antioxidant, 2,2-methylene-bis (4-methyl-6-t.-butylphenol | 2.0 |
| Triethanolamine | 1.0 |
| Paracoumarone-indene resin ([2]) | 10.0 |
| Stearic acid | 3.0 |
| Zinc oxide | 5.0 |
| Di-2-benzothiazyl disulphide | 1.25 |
| N,N′-di-o-tolylguanidine | 1.75 |
| Sulfur | 3.0 |

[1] SBR–1500.
[2] Cumar Resin RH, a trademark product of Allied Chemical Corp.

These compounds were aged over night, remilled and cured for 45 minutes at 287° F.

The physical test data for the respective vulcanizates containing the foregoing silica pigments examples is set forth in Table III hereof.

TABLE III

| Silica tested (in vulcanizates) | Tensile (p.s.i.) | Elongation (percent) | Modulus (300%) | Hardness (Shore A) |
|---|---|---|---|---|
| 1–(1) | 1,485 | 450 | 758 | 71 |
| 1–(2) | 3,640 | 650 | 785 | 65 |
| 1–(3) | 3,180 | 550 | 1,080 | 68 |

*Examples 2 through 10*

All of these examples were prepared from 20 moles of 41°Bé commercial sodium silicate diluted with 63 liters of water except that Examples 7 and 8 had in addition 5 moles of sodium chloride added initially. All examples were at 80° C. acidulated with carbon dioxide.

*Example 2*

To a stainless steel reactor agitated by a propeller stirrer was added 63 liters of water and 14,065 grams (20 moles $Na_2O(SiO_2)_{3.22}$) of 41°Bé commercial sodium silicate. The agitator was started and the dilute sodium silicate solution thoroughly mixed and its temperature raised to 80° C. and maintained.

Carbon dioxide was introduced through a tube leading to the bottom of the reactor.

The carbon dioxide was added in two steps at two different constant rates (see FIG. 2) as follows:

| Step | Addition of carbon dioxide | |
|---|---|---|
| | Quantity (moles) | Time (minutes) |
| I | [1] 0–9.4 | 0–70 |
| II | 9.4–24.2 | 70–534 |

[1] Tyndall effect appeared at 6.2 moles $CO_2$ precipitation commenced at 9.4 moles $CO_2$.

After completion of the acidification, the reactor was cooled and the silica slurry was pumped into a filter where it was filtered and washed until the soluble salt content thereof was in the range of 1 to 2%. A portion of the filter cake was treated with dilute sulfuric acid until a pH of 4.5 was obtained and the silica product was filtered, dried and micropulverized, and was compounded and evaluated as hereinafter set forth (Table IV and V).

*Example 3*

This example was prepared as was Example 2 except that the addition of carbon dioxide was in three steps at different rates as follows (see FIG. 2):

| Step | Addition of carbon dioxide | |
|---|---|---|
| | Quantity (moles) | Time (minutes) |
| I | [1] 0–7.0 | 0–60 |
| II | [2] 7.0–9.7 | 60–120 |
| III | 9.7–24.0 | 120–280 |

[1] Appearance of Tyndall effect.
[2] Commencement of silica precipitation: rate may be increased to maximum rate at which solution will absorb $CO_2$.

The silica product as in Example 2 was filtered and washed until the soluble salt content was in the range of 1 to 2%, a portion of the filter cake was treated with dilute sulfuric acid until a pH of 4.5 was reached and the silica product was filtered, dried and micropulverized, and was compounded and evaluated as set forth in Tables IV and V.

*Example 4 (comparison)*

This example was run like Examples 2 and 3 except that the acidulation was conducted throughout by feeding the carbon dioxide at a constant fast rate (see FIG. 2) as follows:

| Step | Addition of carbon dioxide | |
|---|---|---|
| | Quantity (moles) | Time (minutes) |
| I | 0-24 | 0-255 |

The silica product like that in Examples 2 and 3 was filtered, washed and the pH of the silica filter cake was reduced with dilute sulfuric acid to a pH value of 4.5 after which the silica slurry was filtered, dried at 105° C., and micropulverized, and was likewise compounded and evaluated as in Tables IV and V.

*Example 5*

This example was prepared like Example 2 except that the rate of carbon dioxide acidulation was different (see FIG. 3) and was as follows:

| Step | Addition of carbon dioxide | |
|---|---|---|
| | Quantity (moles) | Time (minutes) |
| I | [1] 0-6.2 | 0-145 |
| II | 6.2-27.2 | 145-335 |

[1] Appearance of Tyndall effect. Rate may be increased to maximum rate at which solution will absorb carbon dioxide.

The silica product was filtered and washed until the soluble salt content was in the range of 1 to 2%. The silica slurry was acidified to a pH of 4.5 with dilute sulfuric acid and the resulting product was filtered, dried at 105° C. and micropulverized, and compounded and evaluated in like manner (Tables IV and V).

*Example 6 (comparison)*

This example was prepared like Example 5 except that the carbon dioxide was added at a constant slow rate in a single step (see FIG. 3) as follows:

| Step | Addition of carbon dioxide | |
|---|---|---|
| | Quantity (moles) | Time (minutes) |
| I | 0-24 | 0-615 |

The resulting silica was filtered and washed until the soluble salts were in the range of 1 to 2% the silica slurry was acidified to a pH of 4.5 with dilute sulfuric acid, filtered, dried at 105° C. and micropulverized, and was compounded and evaluated in like manner (Tables IV and V).

*Example 7*

Figure 4:
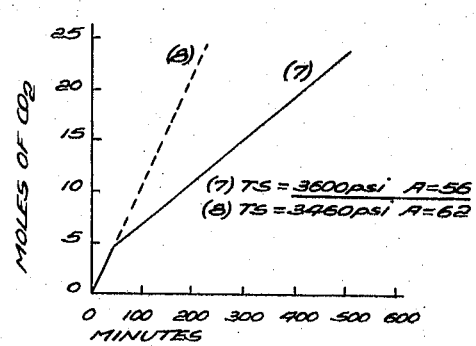

To a stainless steel reactor having a propeller stirrer was added 63 liters of water, 292.5 grams of sodium chloride (5 moles) and 14,065 grams of 41.5° Bé commercial silicate (20 moles $Na_2O(SiO_2)_{3.22}$). The agitator was started and the dilute sodium silicate solution thoroughly mixed and the solution temperature raised and maintained at 80° C. The carbon dioxide was added in two steps at different rates (see FIG. 4) as follows:

| Step | Addition of carbon dioxide | |
|---|---|---|
| | Quantity (moles) | Time (minutes) |
| I | [1] 0-4.8 | 0-54 |
| II | 4.8-24.0 | 54-456 |

[1] Appearance of Tyndall effect.

The silica product was washed until the soluble salts were in the range of 1 to 2%. The washed silica was then treated with a 10% aluminum sulfate solution until a pH of 4.5 was obtained and the resulting product was filtered, washed and micropulverized, and compounded and evaluated (see Tables IV and V).

*Example 8 (comparison)*

In this example the silica was prepared like Example 7 except that the carbon dioxide was fed into the reactor at a constant fast rate (see FIG. 4) as follows:

| Step | Addition of carbon dioxide | |
|---|---|---|
| | Quantity (moles) | Time (minutes) |
| I | 0-24 | 0-225 |

The silica product was after-treated like Example 7 by filtering, washing, lowering the pH to 4.5 with aluminum sulfate, again filtering, drying at 105° C., and micropulverizing and was compounded and evaluated as hereinafter set forth.

*Compounding and evaluation of Examples 2–8*

The silicas of Examples 2 to 8 were each compounded with SBR–1502 in accordance with the compounding recipe given in Table IV.

TABLE IV

| Compound ingredients: | Quantities (wt. parts) |
|---|---|
| Butadiene-styrene copolymer (SBR-1502) | 100 |
| Silica pigment material | 50 |
| Antioxidant, 2,2 - methylene - bis(4-methyl-6-t-butylphenol) (Antioxidant 2246) | 2.0 |
| Triethanolamine | 1.0 |
| Paracoumarone-indene resin (Cumar MH 2½) | 2.5 |
| Reogen | 5.0 |
| Zinc oxide | 5.0 |
| Magnesium oxide | 4.0 |
| Di-2-benzothiazyl disulphide (Altax) | 0.75 |
| N,N'-di-o-tolylguanidine (DOTG) | 1.5 |
| Sulfur | 2.0 |

In compounding the stock the selected silica pigment material was milled into the SBR-1502 together with the antioxidant and other compounding ingredients. The compounded stock was aged overnight and then remilled and cured for 120 minutes at 287° F.

TABLE V.—SILICA EVALUATION IN SBR-1502 VULCANIZATES

| Example (No.) | Hardness (Shore A) | 300% Modulus (p.s.i.) | 500% Modulus (p.s.i.) | Ultimate tensile (p.s.i.) | Elong. (percent) | Goodrich Flex. ($\Delta T$, ° C.) |
|---|---|---|---|---|---|---|
| 2 | 70 | 655 | 1,530 | 4,470 | 800 | 75 |
| 3 | 59 | 600 | 1,245 | 3,590 | 780 | 51 |
| 4 [1] | 65 | 530 | 1,375 | 4,100 | 895 | 68 |
| 5 | 58 | 695 | 1,620 | 3,910 | 695 | 44 |
| 6 [1] | 58 | 915 | 2,160 | 3,150 | 615 | 50 |
| 7 | 56 | 700 | 1,650 | 3,600 | 740 | 54 |
| 8 [1] | 62 | 580 | 1,455 | 3,460 | 730 | 54 |

[1] Comparison example.

Example 9

This example was prepared in a manner similar to Example 2 except that the rate of acidulation was as follows:

| Step | Addition of carbon dioxide | |
|---|---|---|
| | Quantity (moles) | Time (minutes) |
| I | [1] 0-6.5 | 0-105 |
| II | 6.5-24 | 105-630 |

[1] Appearance of Tyndall effect was noticeable at 90 minutes when 5.8 moles of $CO_2$ had been added. Rate I was 53% of Rate II in this example.

The silica product was filtered and washed to reduce the soluble salts to the range of 1 to 2% and then acidified to a pH of 4.5 with dilute sulfuric acid. The resulting silica product was filtered, dried at 105° C. and micropulverized, and was compounded and tested as hereinafter set forth.

Example 10 (comparison)

This example was prepared in a manner similar to Example 9 except that the rate of acidulation was as follows:

| Step | Addition of carbon dioxide | |
|---|---|---|
| | (moles) | (Min.) |
| I | 0-24 | 0-675 |

The silica product was after-treated in a similar manner to that of Example 9. The silica slurry was filtered and washed to reduce the soluble salts to the range of 1 to 2%. The washed silica was acidulated to a pH of 4.5 with dilute sulfuric acid, filtered, dried at 105° C. and micropulverized.

In Example 9 at 105 minutes the degree of acidulation was 6.5 moles of carbon dioxide consumed and for Example 10 at 105 minutes was 3.74 moles, i.e. 57% of the amount consumed in Example 9.

Componding and testing—Examples 9 and 10

The silicas of Examples 9 and 10 were each compounded according to the compounding recipe given in Table IV. The compounding ingredients were incorporated by milling and the stock aged overnight. After remilling the aged stock, it was vulcanized at 287° F. for 120 minutes and the physical properties of the vulcanizate are set forth in Table VI hereof.

TABLE VI.—SILICA EVALUATION IN SBR-1502 VULCANIZATES

| Example (No.) | Hardness (Shore A) | Modulus (p.s.i.) | Tensile (p.s.i.) | Elong. (p.s.i.) | Goodrich Flex. ($\Delta T$, °C.) |
|---|---|---|---|---|---|
| 9 | 58 | 860 | 3,220 | 630 | 39 |
| 10 (comparison) | 58 | 915 | 3,150 | 615 | 50 |

A comparison of the foregoing examples with each other and with the comparative examples will make evident to one skilled in the art the substantial advantages achieved by the invention. Thus:

In Example 1, the conditions were such that the Tyndall effect appeared at a relatively early time, i.e. when about 8 moles of carbon dioxide had been introduced. In the first period, a slow rate of carbonation was employed (in the latter part of the first period especially), a more rapid rate in the second period from 185 to 250 minutes, and a still more rapid rate in the third and fourth period from 250 to 275 minutes, and a silica was obtained which on evaluation showed a good tensile strength coupled with a moderate Shore hardness. In the early part of the first period, a more rapid rate of acidulation was employed and it is believed that by so doing an increased number of silica particles nuclei were obtained contributing toward the production of smaller primary particles. In the third period above 250 minutes, a quite rapid rate of acidulation was employed, contributing to the formation of more and smaller flocs from the colloidal aggregates formed during the second period. The rate during the second period (see FIG. 1) was faster than the average rate during the first period, and contributed to control of the number and size of colloidal aggregates formed.

Figure 2:
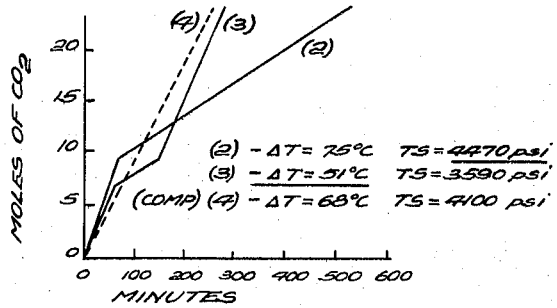

In Example 2, as is well illustrated in FIG. 2, a rapid rate of acidulation was used through the first and second periods, and a slower rate through the third and fourth periods, and a silica was obtained which on evaluation showed an excellent tensile strength of 4470 p.s.i. rendering it well suited for applications requiring strength without excessive dynamic motion.

In Example 3, as is shown for comparison in FIG. 2, The rapid rate was used in the first period, but a slow rate was used during the second period between the appearance of the Tyndall effect and the commencement of precipitation. This modification of rates greatly reduced the heat build up (Goodrich Flexometer heat rise, $\Delta T$) from 75° C. to 51° C., thus rendering the vulcanizate useful for dynamic applications such as tire stocks, without unduly lowering the tensile strength which still remained at 3590 p.s.i.

The effect of the rate variations in Example 3 are further evidenced by the comparison of this example with the comparative Example 4, in which a constant rate of acidulation comparable with the average rate of acidulation of Example 3 was used. This comparison shows that with little sacrifice of tensile strength compared to Example 4, Example 3 gave a much better heat build up characteristic.

Figure 3:
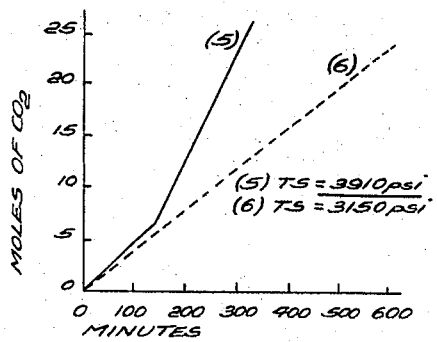

The effect of change of acidulation rate at the Tyndall point is further exemplified in Examples 5 and 6 set out in FIG. 3. In Example 5 the slow rate was used in the first period and the more rapid rate in the second, third and fourth periods, while in Example 6 the slow rate was continued throughout all four periods. These examples show that the increase of rate after the appearance of the Tyndall effect in Example 5 not only increased the tensile strength of the vulcanizate as compared to Example 6 completely performed at the slow rate, but also reduced the heat build up substantially.

In Example 7 and comparative Example 8, the rapid rate was used prior to the appearance of the Tyndall effect, and both examples showed heat build ups of 54° C. In Example 7, the low rate was used in the second and subsequent stages, while the faster rate was continued in comparative Example 8. The change in rate produced not only an improved tensile strength, but also an improved Shore "A" hardness reading of 56.

In Example 9 the more rapid rate was used in the first period and the slower rate after the appearance of the Tyndall effect through the second, third and fourth periods, while for comparison in Example 10 the slow rate was used throughout. Also in this example the faster rate was only about 1.9 times the slower rate. This relatively small rate change still produced marked improvements in the silica, reducing the heat build-up from 50 to 39° C. without loss of tensile strength.

While there have been described herein what are at

What is claimed is:

1. In a process for the production of silica pigment by the acidulation with carbon dioxide of an aqueous solution of sodium silicate, the improvement which comprises:
   (a) feeding the $CO_2$ into the solution at a rapid rate prior to the appearance of Tyndall effect in the solution, and
   (b) feeding the $CO_2$ into the solution at a reduced rate during the period from the appearance of the Tyndall effect until the commencement of precipitation,
   (c) said rapid rate being limited only by the rate at which the solution under the conditions of acidulation can absorb $CO_2$ and being at least twice said reduced rate, and
   (d) said reduced rate being no more than one-half the rate at which the solution can absorb carbon dioxide as aforesaid.

2. In a process for the production of silica pigment by the acidulation with carbon dioxide of an aqueous solution of sodium silicate designated by the formula $Na_2O(SiO_2)_x$, the improvement which comprises:
   (a) feeding the $CO_2$ into the solution at a rapid rate prior to the appearance of Tyndall effect in the solution, which appearance occurs when the value of $x$ lies in the range of 4.2 to 5.3, and
   (b) feeding the $CO_2$ into the solution at a reduced rate during the period from the appearance of the Tyndall effect until the commencement of precipitation, which commencement occurs when the value of $x$ reaches about 6.4,
   (c) said rapid rate being limited only by the rate at which the solution under the conditions of acidulation can absorb $CO_2$ and being at least about twice said reduced rate, and
   (d) said reduced rate being no more than one-half the rate at which the solution can absorb carbon dioxide as aforesaid.

3. In a process for the production of silica pigment by the acidulation which carbon dioxide of an aqueous solution of alkali metal silicate designated by the formula $M_2O(SiO_2)_x$—wherein M is alkali metal—the improvement which comprises:
   (a) feeding the $CO_2$ into the solution at a rapid rate during a first stage of the acidulation in which colloidal primary silica particles are being formed but in which no appreciable number of colloidal silica particles have aggregated to form colloidal network particles, said first stage extending until the value of $x$ lies in the range of 4.2 to 5.3, and
   (b) then feeding the $CO_2$ into the solution at a slower rate during the next stage of the acidulation in which colloidal silica particles are aggregating to form colloidal network particles, which next stage extends from the end of said first stage until the value of $x$ reaches about 6.4 and precipitation commences to occur,
   (c) said rapid rate being limited only by the rate at which the solution under the conditions of acidulation can absorb $CO_2$ and being at least about twice said reduced rate, and
   (d) said reduced rate being no more than one-half the rate at which the solution can absorb carbon dioxide as aforesaid.

4. In a process for the production of silica pigment by the acidulation with carbon dioxide of an aqueous solution of alkali metal silicate, the improvement which comprises:
   (a) dividing the acidulation into four stages, the first and second stages being separated by the appearance of a Tyndall effect in the solution, the second and third stages being separated by the commencement of precipitation from the solution, and the third and fourth stages being separated by the completion of the precipitation from the solution, and
   (b) varying the rates of addition of the carbon dioxide during at least two of the first three stages of acidulation relative to each other so that during one of said two stages the acidulation is conducted at a faster rate and in the other of said two stages the acidulation is conducted in a slower rate,
   (c) said faster rate being limited only by the rate at which the solution under the conditions of acidulation can absorb $CO_2$ and being at least about $\frac{3}{2}$ said slower rate, and
   (d) said slower rate being no more than $\frac{2}{3}$ the rate at which the solution can absorb carbon dioxide as aforesaid.

5. A process as defined in claim 4, wherein the average rate employed in the first period is a fast rate as defined therein, the average rate employed in the second period is a slow rate as defined therein, and the average rate employed in the third period is a slow rate as defined therein.

6. A process as defined in claim 4, wherein the average rate employed in the first period is a slow rate as defined therein, the average rate employed in the second period is a fast rate as defined therein, and the average rate employed in the third period is a slow rate as defined therein.

7. A process as defined in claim 4, wherein the average rate employed in the first period is a slow rate as defined therein, the average rate employed in the second period is a slow rate as defined therein, and the average rate employed in the third period is a fast rate as defined therein.

8. A process as defined in claim 4, wherein the average rate employed in the first period is a slow rate as defined therein, the average rate employed in the second period is a fast rate as defined therein, and the average rate employed in the third period is a fast rate as defined therein.

9. A process as defined in claim 4, wherein the average rate employed in the first period is a fast rate as defined therein, the average rate employed in the second period is a slow rate as defined therein, and the average rate employed in the third period is a fast rate as defined therein.

10. A process as defined in claim 4, wherein the average rate employed in the first period is a fast rate as defined therein, the average rate employed in the second period is a fast rate as defined therein, and the average rate employed in the third period is a slow rate as defined therein.

11. A process as defined in claim 4, wherein three different average rates of acidulation are employed in the first three stages, respectively.

12. In a process for the production of silica pigment by the acidulation with carbon dioxide of an aqueous solution of alkali metal silicate designated by the formula $M_2O(SiO_2)_x$—wherein M is alkali metal—the improvement which comprises:
   (a) dividing the acidulation into four stages, the first stage ending when the value of $x$ reaches 4.2, the second stage ending when the value of $x$ reaches 6.4, and the third stage ending when the value of $x$ reaches 10, and
   (b) varying the rates of addition of the carbon dioxide during at least two of the first three stages of acidulation relative to each other so that during one of said two stages the acidulation is conducted at a faster rate, and in the other of said two stages the acidulation is conducted at a slower rate,
   (c) said faster rate being limited only by the rate at which the solution under the conditions of acidulation can absorb $CO_2$ and being at least about ½ said slower rate, and (d) said slower rate being no more than ⅔ the rate at which the solution can absorb carbon dioxide as aforesaid.

13. A process as defined in claim 12, wherein the average rate employed in the first period is a fast rate as defined therein, the average rate employed in the second period is a slow rate as defined therein, and the average rate employed in the third period is a slow rate as defined therein.

14. A process as defined in claim 12, wherein the average rate employed in the first period is a slow rate as defined therein, the average rate employed in the second period is a fast rate as defined therein, and the average rate employed in the third period is a slow rate as defined therein.

15. A process as defined in claim 12, wherein the average rate employed in the first period is a slow rate as defined therein, the average rate employed in the second period is a slow rate as defined therein, and the average rate employed in the third period is a fast rate as defined therein.

16. A process as defined in claim 12, wherein the average rate employed in the first period is a slow rate as defined therein, the average rate employed in the second period is a fast rate as defined therein, and the average rate employed in the third period is a fast rate as defined therein.

17. A process as defined in claim 12, wherein the average rate employed in the first period is a fast rate as defined therein, the average rate employed in the second period is a slow rate as defined therein, and the average rate employed in the third period is a fast rate as defined therein.

18. A process as defined in claim 12, wherein the average rate employed in the first period is a fast rate as defined therein, the average rate employed in the second period is a fast rate as defined therein, and the average rate employed in the third period is a slow rate as defined therein.

19. A process as defined in claim 12, wherein three different average rates of acidulation are employed in the first three stages, respectively.

References Cited by the Examiner
UNITED STATES PATENTS

| | | | |
|---|---|---|---|
| 2,141,132 | 12/1938 | Folger | 23—182 X |
| 2,924,510 | 2/1960 | Allen | 23—182 |

OSCAR R. VERTIZ, *Primary Examiner.*

MAURICE A. BRINDISI, *Examiner.*

H. S. MILLER, *Assistant Examiner.*